United States Patent
Saito et al.

(10) Patent No.: US 12,395,500 B2
(45) Date of Patent: Aug. 19, 2025

(54) IN-VEHICLE EQUIPMENT, VEHICLE, AND METHOD

(71) Applicant: HONDA MOTOR CO., LTD., Tokyo (JP)

(72) Inventors: Daisuke Saito, Tokyo (JP); Yuki Hirono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 95 days.

(21) Appl. No.: 18/182,408

(22) Filed: Mar. 13, 2023

(65) Prior Publication Data

US 2023/0308456 A1 Sep. 28, 2023

(30) Foreign Application Priority Data

Mar. 28, 2022 (JP) ................................. 2022-051388

(51) Int. Cl.
*H04L 9/40* (2022.01)
*B60R 16/023* (2006.01)
*H04L 12/40* (2006.01)

(52) U.S. Cl.
CPC ...... *H04L 63/1408* (2013.01); *B60R 16/0231* (2013.01); *H04L 12/40* (2013.01); *H04L 2012/40215* (2013.01); *H04L 2012/40273* (2013.01)

(58) Field of Classification Search
CPC .............. H04L 63/1408; H04L 12/40; H04L 2012/40215; H04L 2012/40273; B60R 16/0231
See application file for complete search history.

(56) References Cited

U.S. PATENT DOCUMENTS

2019/0230101 A1    7/2019   Yajima
2021/0273956 A1*   9/2021   Nishimoto ............ H04L 67/562

FOREIGN PATENT DOCUMENTS

| JP | 2018145817 A | 9/2018 |
| JP | 2019126003 A | 7/2019 |
| JP | 2019126004 A | 7/2019 |
| JP | 2021136631 A | 9/2021 |

OTHER PUBLICATIONS

Office Action issued for counterpart Japanese Application No. 2022-051388, transmitted from the Japanese Patent Office on Jul. 15, 2025.

* cited by examiner

*Primary Examiner* — Lindsay M Low
*Assistant Examiner* — Charles J Brauch

(57) ABSTRACT

An in-vehicle equipment includes: a signal detection unit configured to detect a signal expected to be input to a communication network at a predetermined input cycle; a counting unit configured to count the number of times a signal is detected by the signal detection unit; and a determination unit configured to determine whether the number of times counted by the counting unit within a predetermined first period is equal to or less than a threshold value set between a first value calculated by dividing the first period by the input cycle and a second value calculated on the basis of the first period and the input cycle on assumption that an illegal signal is further input to the communication network.

15 Claims, 8 Drawing Sheets

| PERIOD | | | INPUT CYCLE | | | NO ATTACK | WITH ATTACK |
|---|---|---|---|---|---|---|---|
| 0.9T | DESIGN VALUE T | 1.1T | 0.8F | DESIGN VALUE F | 1.2F | MAXIMUM NUMBER OF TIMES OF DETECTION 1.1T/0.8F | MINIMUM NUMBER OF TIMES OF DETECTION 2*0.9T/1.2F |
| 1350 | 1500 | 1650 | 8 | 10 | 12 | 206 | 225 |

FIG.4

| PERIOD | | | INPUT CYCLE | NO ATTACK | WITH ATTACK |
|---|---|---|---|---|---|
| 0.9T | DESIGN VALUE T | 1.1T | ACTUAL MEASURE-MENT VALUE F | MAXIMUM NUMBER OF TIMES OF DETECTION 1.1T/F | MINIMUM NUMBER OF TIMES OF DETECTION 2*0.9T/F |
| 450 | 500 | 550 | 10.1 | 54 | 89 |

FIG.5

IN-VEHICLE EQUIPMENT, VEHICLE, AND METHOD

The contents of the following Japanese patent application (s) are incorporated herein by reference:
NO. 2022-051388 filed in JP on Mar. 28, 2022.

BACKGROUND

1. Technical Field

The present invention relates to an in-vehicle equipment, a vehicle, and a method.

2. Related Art

Patent Document 1 discloses determining a normal range of an air-fuel ratio learning value in an engine.

CITATION LIST

Patent Document 1: Japanese Patent Application Publication No. 2018-145817

BRIEF DESCRIPTION OF THE DRAWINGS

FIG. 4 is a diagram illustrating a maximum number of times of detection in which a signal can be detected when there is no impersonation attack and a minimum number of times of detection in which a signal can be detected when there is an impersonation attack.

FIG. 5 is a diagram illustrating the maximum number of times of detection and the minimum number of times of detection when an actual measurement value of an input cycle F is used.

DESCRIPTION OF EXEMPLARY EMBODIMENTS

Hereinafter, embodiments of the present invention will be described, but the embodiments do not limit the invention according to the claims. In addition, not all of the combinations of features described in the embodiments are essential to the solving means of the invention.

Figure 1:
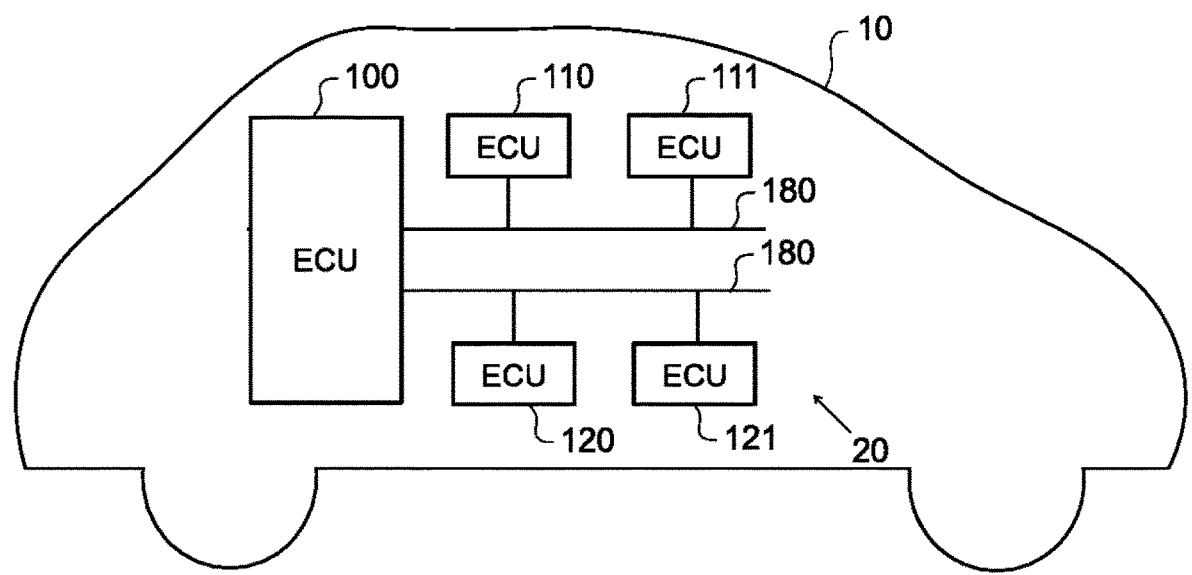
FIG. 1 conceptually illustrates a system configuration of a vehicle 10 in an embodiment.

FIG. 1 conceptually illustrates a system configuration of a vehicle 10 in an embodiment. The vehicle 10 includes a system 20. The system 20 includes a plurality of ECUs (electronic control units) including an ECU 100, an ECU 110, an ECU 111, an ECU 120, and an ECU 121. The ECUs included in the vehicle 10 include an ECU for controlling an equipment that directly affects the traveling of the vehicle 10 such as an engine, a transmission, and a steering apparatus. The ECUs included in the vehicle 10 include an ECU for controlling an equipment that does not directly affect the traveling of the vehicle 10 such as an air conditioner and a navigation apparatus. The ECU 100, the ECU 110, the ECU 111, the ECU 120, and the ECU 121 are examples of an in-vehicle equipment.

The ECUs included in the vehicle 10 communicate with each other by controller area network (CAN) communication. The ECUs included in the vehicle 10 are communicably connected to each other by a plurality of CAN communication networks 180. The ECU 100 functions as a gateway that relays communication between the plurality of CAN communication networks 180.

Figure 2:
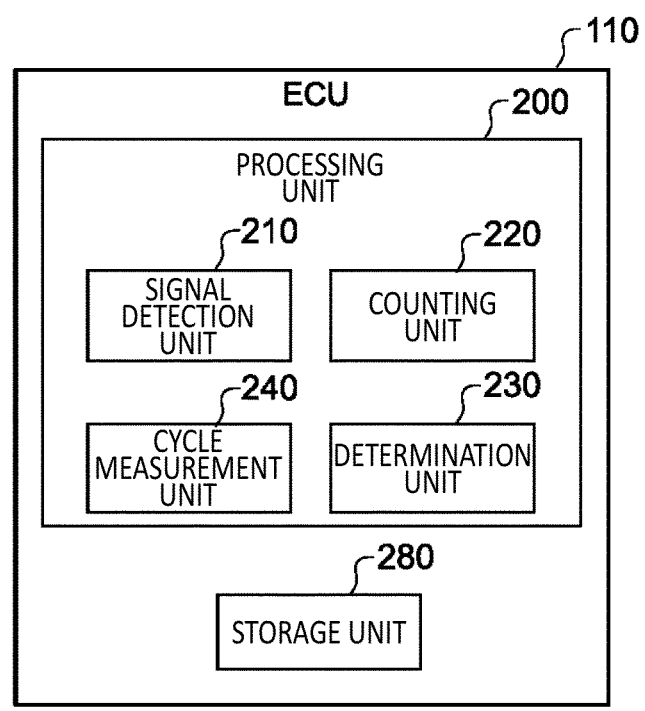
FIG. 2 is a block diagram schematically illustrating a functional configuration included in an ECU 110.

FIG. 2 is a block diagram schematically illustrating a functional configuration included in the ECU 110. The ECU 110 includes a processing unit 200 and a storage unit 280. The ECU 110 performs processing of determining whether there is a so-called impersonation attack in which a third party impersonates an ECU and transmits an illegal signal to the CAN communication network 180.

The processing unit 200 may be implemented by a processor such as a CPU that performs arithmetic processing. The storage unit 280 may include a nonvolatile storage medium such as a flash memory and a volatile storage medium such as a random access memory. The ECU 110 may include a computer. The ECU 110 executes various controls by the processing unit 200 operating according to a program stored in the nonvolatile storage medium.

The processing unit 200 includes a signal detection unit 210, a counting unit 220, a determination unit 230, and a cycle measurement unit 240. The signal detection unit 210 detects a signal expected to be input to the communication network at a predetermined input cycle. The counting unit 220 counts the number of times a signal is detected by the signal detection unit 210.

In a first determination method, the determination unit 230 determines whether the number of times counted by the counting unit 220 within a predetermined first period is equal to or less than a threshold value set between a first value calculated by dividing the first period by the input cycle and a second value calculated on the basis of the first period and the input cycle on the assumption that an illegal signal is further input to the communication network. By setting the threshold value between the first value and the second value, a possibility of erroneously sensing detecting an impersonation attack can be reduced.

In the first determination method, the determination unit 230 sets the threshold value between a maximum value of the first value and a minimum value of the second value calculated on the assumption that an error is included in the first period and the input cycle. As a result, it is possible to reduce a time until the impersonation attack is sensed while reducing the possibility of erroneously sensing the impersonation attack.

In the first determination method, the cycle measurement unit 240 measures the actual measurement value of the input cycle on the basis of the number of times counted by the counting unit 220. Until the actual measurement value of the input cycle is measured by the cycle measurement unit 240, the determination unit 230 determines whether the number of times counted by the counting unit 220 within a predetermined second period is equal to or less than a predetermined third value. Then, when the actual measurement value of the input cycle is measured by the cycle measurement unit 240, the determination unit 230 calculates the first value by dividing the first period by the actual measurement value of the input cycle, calculates the second value calculated on the basis of the first period and the actual measurement value of the input cycle on the assumption that an illegal signal is further input to the communication network, and starts determination as to whether the number of times counted by the counting unit 220 within the first period is equal to or less than the first value. As a result, when the actual measurement value of the input cycle is measured, it is possible to start the detection of the impersonation attack based on the actual measurement value of the input cycle.

In the first determination method, when the actual measurement value of the input cycle is measured by the cycle measurement unit 240, the determination unit 230 sets the first period shorter than the second period on the basis of the actual measurement value of the input cycle. As a result, it is possible to quickly detect the impersonation attack.

In a second determination method different from the first determination method, the determination unit 230 may determine whether the number of times counted by the counting unit 220 within the predetermined first period is equal to or less than the first value calculated by dividing the first period by a past actual measurement value of the input cycle. In the second determination method, the determination unit 230 may determine whether the number of times counted by the counting unit 220 within the first period is equal to or less than the maximum value of the first value calculated on the assumption that an error is included in the first period. As a result, it is possible to shorten the time until the impersonation attack is sensed.

In the second determination method, the determination unit 230 may determine whether the number of times counted by the counting unit 220 within the first period is equal to or less than the threshold value set between the first value and the second value calculated on the basis of the first period and the actual measurement value of the input cycle on the assumption that an illegal signal is further input to the communication network. As a result, it is possible to reduce the possibility of erroneously detecting the impersonation attack.

In the second determination method, the determination unit 230 may set the threshold value between the maximum value of the first value and the minimum value of the second value calculated on the assumption that an error is included in the first period. As a result, it is possible to shorten the time until the impersonation attack is detected.

Also in the second determination method, until the actual measurement value of the input cycle is measured by the cycle measurement unit 240, the determination unit 230 may determine whether the number of times counted by the counting unit 220 within the predetermined second period is equal to or less than the predetermined third value. Then, when the actual measurement value of the input cycle is measured by the cycle measurement unit 240, the determination unit 230 may calculate the first value by using the actual measurement value of the input cycle and start determination as to whether the number of times counted by the counting unit 220 within the first period is equal to or less than the first value. As a result, when the actual measurement value of the input cycle is measured, it is possible to start the detection of the impersonation attack based on the actual measurement value of the input cycle.

In the second determination method, when the actual measurement value of the input cycle is measured by the cycle measurement unit 240, the determination unit 230 may set the first period shorter than the second period on the basis of the actual measurement value of the input cycle. As a result, it is possible to quickly detect the impersonation attack.

Figure 3:
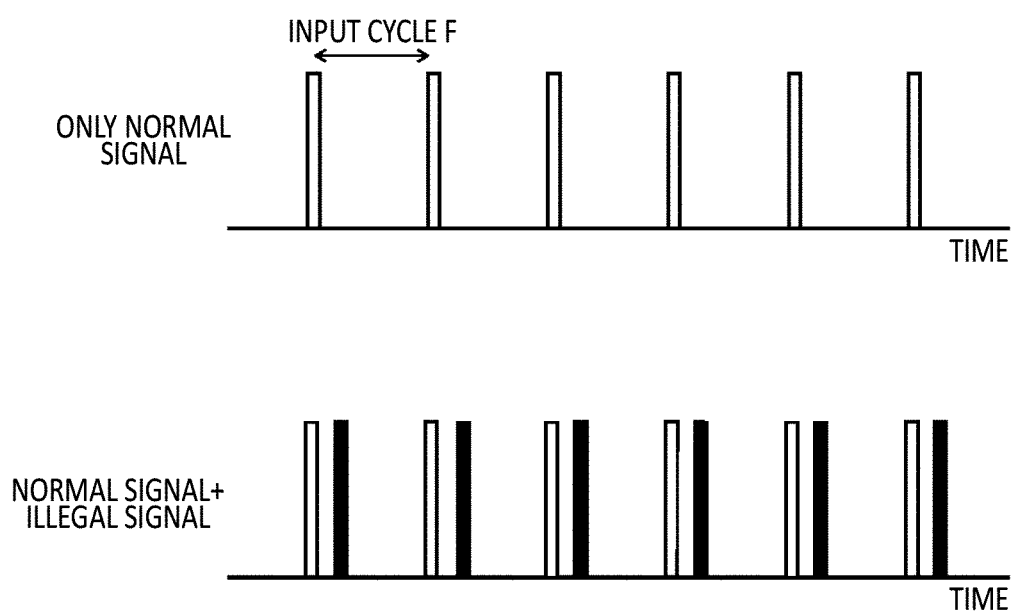
FIG. 3 illustrates comparison between a case where only a normal signal is input to a CAN communication network 180 and a case where a normal signal and an illegal signal are input to the CAN communication network.

FIG. 3 illustrates comparison between a case where only a normal signal is input to the CAN communication network 180 and a case where a normal signal and an illegal signal are input to the CAN communication network. The normal signal is, for example, a signal output from the ECU 110 to the CAN communication network 180. The ECU 110 performs control such that a signal is input to the CAN communication network 180 at a predetermined input cycle F. Since an error may occur in processing in which the ECU 110 inputs a signal to the CAN communication network 180, an error may also occur in a time interval between consecutive normal signals, but the time interval between consecutive normal signals is approximately the input cycle F. That is, the normal signal is expected to be input to the CAN communication network 180 at the predetermined input cycle F.

Next, a case will be described in which a malicious third party impersonates the ECU 111 and inputs an illegal signal to the CAN communication network 180. For example, when it is sensed that a signal assigned with a specific CAN ID is input from the ECU 110 to the CAN communication network 180, a malicious third party inputs an illegal signal assigned with the CAN ID to the CAN communication network 180. As a result, about twice as many signals as that in a case where no illegal signal is input are input to the CAN communication network 180. Therefore, the counting unit 220 counts the number of signals assigned with a specific CAN ID among the signals detected by the signal detection unit 210, and the determination unit 230 determines whether an illegal signal has been input to the CAN communication network 180 on the basis of the number of signals counted by the counting unit 220 within a predetermined period T.

FIG. 4 is a diagram illustrating a maximum number of times of detection in which a signal can be detected when there is no impersonation attack and a minimum number of times of detection in which a signal can be detected when there is an impersonation attack. FIG. 4 illustrates the maximum number of times of detection and the minimum number of times of detection when it is assumed that there is an error of ±10% in a design value T of the period in which the signal is counted and an error of ±20% may occur in the design value F of the input cycle.

FIG. 4 illustrates a case where the design value of the period T for counting signals is 1500 ms and the design value of the input cycle F is 10 ms. The maximum number of times of detection in which a signal can be detected when there is no impersonation attack is calculated by 1.1T/0.8F. In a case where there is an impersonation attack, when the number of signals per unit time is twice as large as that in a case where there is no impersonation attack, the minimum number of times of detection in which a signal can be detected when there is an impersonation attack is calculated by 2×0.9T/1.2F. As illustrated in FIG. 4, the maximum number of times of detection of signals when there is no impersonation attack is 206, and the minimum number of times of detection of signals when there is an impersonation attack is 225.

In this regard, when 1500 ms is adopted as the period T, the determination unit 230 sets, between 206 and 225, a threshold value for determining whether there is an illegal signal, determines that there is no illegal signal when the number of times a signal is detected within the period of 1500 ms is equal to or less than the threshold value, and determines that there is an illegal signal when the number of times a signal is detected within the period of 1500 ms exceeds the threshold value. A lower limit value that can be set as the threshold value is 206, and an upper limit value is 225. By setting the threshold value in this manner, it can be expected to appropriately determine whether there is an illegal signal even in consideration of an error that may occur in the period T and the input cycle F.

The determination unit 230 may set the threshold value for determining whether there is an illegal signal without considering an error. For example, the determination unit 230 may set the threshold value between T/F, which is the number of times a signal can be detected when there is no impersonation attack, and 2T/F, which is the number of times a signal can be detected when there is an impersonation attack.

FIG. 5 is a diagram illustrating the maximum number of times of detection and the minimum number of times of detection when the actual measurement value of the input cycle F is used. FIG. 5 illustrates the maximum number of times of detection and the minimum number of times of detection when it is assumed that an error of ±10% may occur in the design value of the period T. In the description related to FIG. 5, the actual measurement value of the input cycle may be represented by "F".

FIG. 5 illustrates a case where the design value of the period T for counting signals is 500 ms and the actual measurement value of the input cycle F is 10.1 ms. The maximum number of times of detection in which a signal can be detected when there is no impersonation attack is calculated by 1.1T/F. The minimum number of times of detection in which a signal can be detected when there is an impersonation attack is calculated by 2×0.9T/F. As illustrated in FIG. 5, the maximum number of times of detection of signals when there is no impersonation attack is 54, and the minimum number of times of detection of signals when there is an impersonation attack is 89.

In this regard, when 500 ms is adopted as the period T, the determination unit 230 sets, between 54 and 89, the threshold value for determining whether there is an illegal signal, determines that there is no illegal signal when the number of times a signal is detected within the period of 500 ms is equal to or less than the threshold value, and determines that there is an illegal signal when the number of times a signal is detected within the period of 500 ms exceeds the threshold value. The lower limit value that can be set as the threshold value is 54, and the upper limit value is 89. By setting the threshold value in this manner, it is expected that whether there is an illegal signal can be appropriately determined even in consideration of an error that may occur in the period T. As illustrated in FIG. 5, since a difference between the maximum number of times of detection and the minimum number of times of detection is 35, which is relatively large, the possibility of occurrence of erroneous determination is also reduced.

The determination unit 230 may set the threshold value for determining whether there is an illegal signal by using the actual measurement value of the input cycle F without considering the error in the period T. For example, the determination unit 230 may set the threshold value between T/F, which is the number of times a signal can be detected when there is no impersonation attack, and 2T/F, which is the number of times a signal can be detected when there is an impersonation attack. The determination unit 230 may set, to T/F, the threshold value for determining whether there is an illegal signal. The determination unit 230 may set, to 2T/F, the threshold value for determining whether there is an illegal signal.

Next, a relationship between the input cycle F and the period T will be described. In order to quickly determine whether there is an illegal signal, it is desirable to shorten the period T. In general, when the minimum number of times of detection in which a signal can be detected when there is an impersonation attack is A and the maximum number of times of detection in which a signal can be detected when there is no impersonation attack is N, it is necessary to satisfy a requirement of A−N≥1 in order to determine whether there is an illegal signal.

First, as described with reference to FIG. 4, a case will be described in which an error of ±20% occurs in the input cycle F and an error of ±10% occurs in the period T. In this case, N=1.1 T/0.8F. In a case where there is an impersonation attack, when the number of signals per unit time is twice as large as that in a case where there is no impersonation attack, A=2×0.9T/1.2F is obtained. Therefore, in order to determine whether there is an illegal signal, it is necessary to satisfy 2×0.9T/1.2F−1.1T/0.8F≥1. As a result, in order to determine whether there is an illegal signal, it is necessary to satisfy T≥8F. That is, assuming that an error of ±20% occurs in the input cycle F and an error of ±10% occurs in the period T, the period T that is eight times or more the input cycle F is required to determine whether there is an illegal signal.

On the other hand, as described with reference to FIG. 5, a case will be described in which an actual measurement value is used for the input cycle F and an error of ±10% occurs in the period T. In this case, N=1.1T/F. In a case where there is an impersonation attack, when the number of signals per unit time is twice as large as that in a case where there is no impersonation attack, A=2×0.9T/F is obtained. Therefore, in order to determine whether there is an illegal signal, it is necessary to satisfy 2×0.9T/F−1.1T/F≥1. As a result, in order to determine whether there is an illegal signal, it is sufficient if T≥1.43F. Therefore, by using the actual measurement value for the input cycle F, the period T can be shortened as compared with a case where the actual measurement value is not used for the input cycle F.

Figure 6:
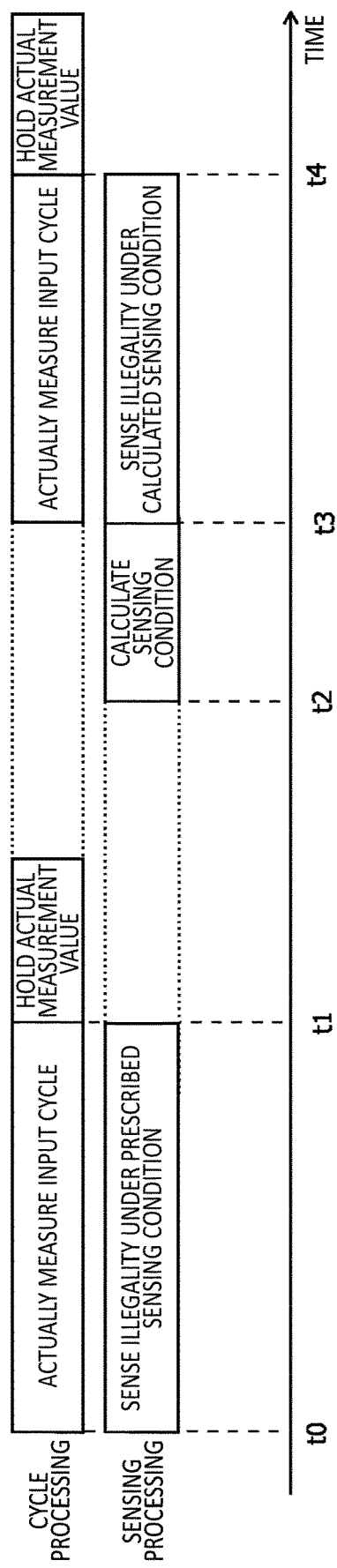
FIG. 6 illustrates contents of processing of determining an illegal signal and processing of measuring the input cycle F, the processing being executed in two drive cycles.

FIG. 6 illustrates contents of processing of determining an illegal signal and processing of measuring the input cycle F, the processing being executed in two drive cycles. First, in a first drive cycle after the vehicle 10 is handed over to the user, the actual measurement value of the input cycle F is not obtained. For this reason, in the first drive cycle starting from time t0, the cycle measurement unit 240 measures the input cycle F.

For example, the cycle measurement unit 240 acquires the number of times the signal is counted by the counting unit 220 every time a predetermined period elapses, and calculates the input cycle of the signal in each of a plurality of periods. The cycle measurement unit 240 averages the input cycles calculated in the plurality of periods to calculate the actual measurement value of the input cycle F.

In the first drive cycle, while the cycle measurement unit 240 measures the actual measurement value of the input cycle F, the determination unit 230 determines the presence or absence of an illegal signal under a prescribed detection condition. The prescribed detection condition includes a period T and a threshold value as detection variables. The period T is set to satisfy at least a requirement of T≥8F. The threshold value is set between the maximum number of times of detection and the minimum number of times of detection calculated from the input cycle F and the period T, for example, as described with reference to FIG. 4. The period T and the threshold value configuring the prescribed detection condition may be determined in advance according to the input cycle F.

The determination unit 230 acquires the number of times of detection of the signal counted by the counting unit 220 every time the period T elapses until the end of the first drive cycle, and determines that there is an illegal signal when the acquired number of times exceeds the threshold value. When the first drive cycle ends at time t1, the storage unit 280 stores, in a nonvolatile storage region, the actual measurement value of the input cycle F measured by the cycle measurement unit 240 from time t0 to time t1.

When the second drive cycle starts at time t2, the determination unit 230 reads the actual measurement value of the input cycle F from the storage unit 280 and calculates the detection condition by using the actual measurement value of the input cycle F. The detection condition includes a period T and a threshold value as detection variables. The determination unit 230 uses the actual measurement value of the input cycle F to set the period T to satisfy at least a requirement of T≥1.43F. In this case, the determination unit 230 can set, as the period T, a period shorter than the period configuring the prescribed detection condition. For example, as described with reference to FIG. 5, the determination unit 230 sets the threshold value on the basis of a value obtained by dividing the period T considering the error of the period T by the input cycle F. The determination unit 230 may set the threshold value between the calculated maximum number of times of detection and the calculated minimum number of times of detection.

When the traveling of the vehicle 10 is started from time t3, the determination unit 230 determines the presence or absence of an illegal signal under the detection condition calculated by using the actual measurement value of the input cycle F. Specifically, the determination unit 230 acquires the number of times of detection of the signal counted by the counting unit 220 every time the period T elapses, and determines that there is an illegal signal when the acquired number of times exceeds the threshold value.

In the second drive cycle, the cycle measurement unit 240 continues to measure the input cycle while the determination unit 230 determines the presence or absence of an illegal signal under the detection condition calculated by using the actual measurement value of the input cycle F. When the first drive cycle ends at time t4, the storage unit 280 stores the actual measurement value of the input cycle F measured by the cycle measurement unit 240 from time t3 to time t4. The actual measurement value of the input cycle F stored in the storage unit 280 is used to calculate the sensing condition when the next drive cycle starts.

When the measurement of the actual measurement value of the input cycle F is completed in the first drive cycle, the determination unit 230 may calculate the sensing condition on the basis of the actual measurement value of the input cycle F in the middle of the first drive cycle, and start the determination of the presence or absence of the illegal signal under the detection condition calculated by using the actual measurement value of the input cycle F.

Figure 7:
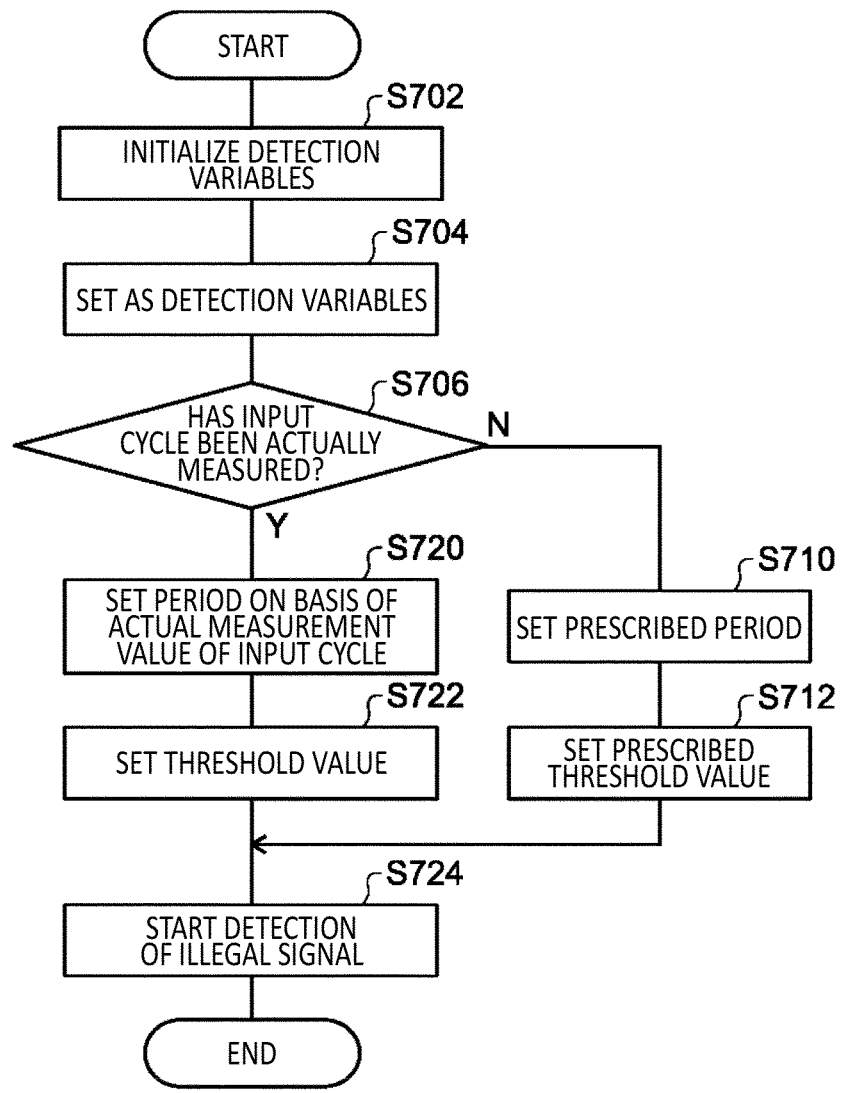
FIG. 7 is a flowchart illustrating processing executed by the ECU 110.

FIG. 7 is a flowchart illustrating processing executed by the ECU 110. The processing of the flowchart illustrated in FIG. 7 is started at the start of the drive cycle.

In S702, detection variables for detecting an illegal signal are initialized. The detection variables includes variables of the input cycle F, the actual measurement value of the input cycle F, the period T, and the threshold value. In S704, the values stored in the storage unit 280 are set as the detection variables. In S706, the determination unit 230 determines whether the input cycle F has been actually measured. When the input cycle F has not been actually measured, a prescribed period is set to the variable of the period T in S710, and a prescribed threshold value is set to the variable of the threshold value in S712. Subsequently, in S724, the determination unit 230 starts processing of detecting the illegal signal on the basis of the period T and the threshold value set in S710 and S712.

When it is determined that the actual measurement of the input cycle F has been completed in S706, a value considering the actual measurement value of the input cycle F is set to the variable of the period T in S720. In S722, a value based on the value obtained by dividing the period T by the actual measurement value of the input cycle F is set as the variable of the threshold value. As described with reference to FIG. 5, the threshold value is set in consideration of the error in the period T. Subsequently, in S724, the determination unit 230 starts the processing of detecting the illegal signal on the basis of the period T and the threshold value set in S720 and S722.

According to the system 20 described above, the period T for counting signals in order to detect an illegal signal due to an impersonation attack can be shortened by using the actual measurement value of the input cycle F. As a result, it is possible to quickly detect an impersonation attack. In addition, by holding the actual measurement value of the input cycle F in the storage unit 280, it is possible to quickly detect an impersonation attack in a short time by using the input cycle F actually measured in the past.

Figure 8:
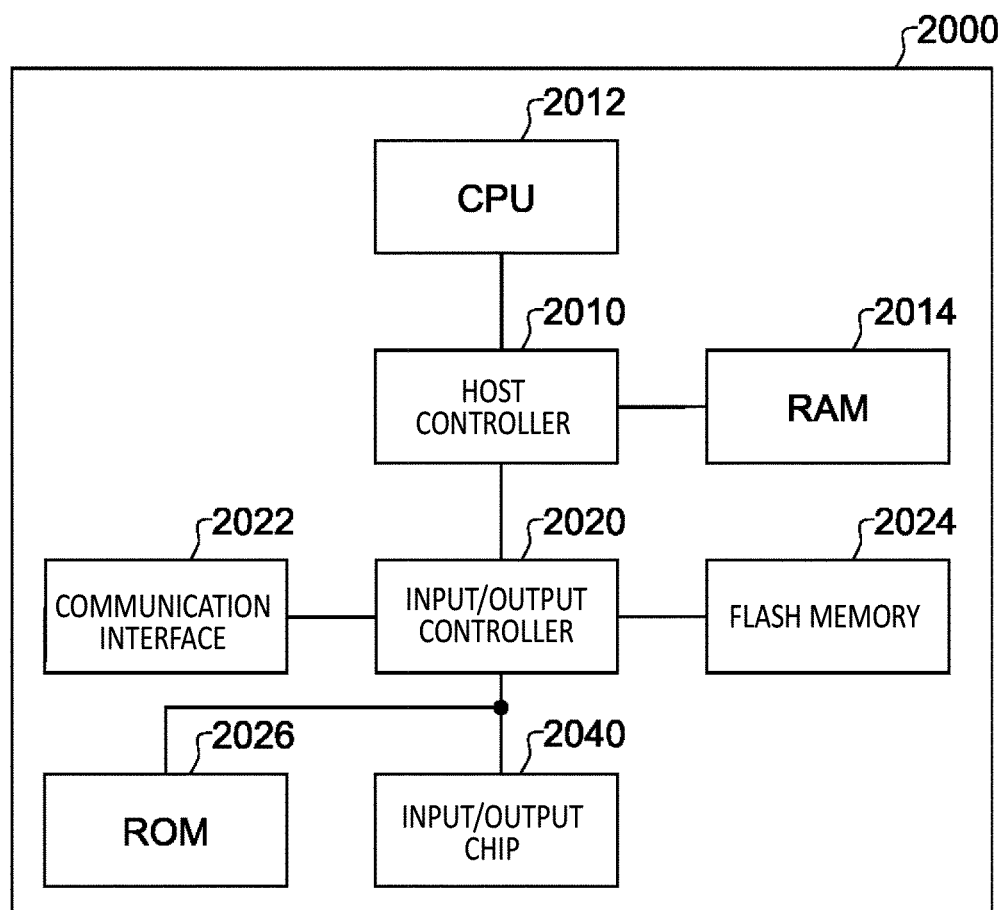
FIG. 8 illustrates an example of a computer 2000.

FIG. 8 illustrates an example of a computer 2000 in which a plurality of embodiments of the present invention may be entirely or partially embodied. A program installed in the computer 2000 can cause the computer 2000 to function as a system such as the system 20 or each unit of the system, an apparatus such as the ECU 110, or each unit of the apparatus according to the embodiment to execute an operation associated with the system or each unit of the system, the apparatus, or each unit of the apparatus and/or execute a process or a step of the process according to the embodiment. Such a program may be executed by a CPU 2012 to cause the computer 2000 to perform certain operations associated with the processing procedures described herein and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and a HDMI (registered trademark) port.

A program is provided via a network or computer-readable storage media such as a CD-ROM, a DVD-ROM, or a memory card. The RAM 2014, the ROM 2026, or the flash memory 2024 is an example of the computer-readable storage medium. Programs are installed in the flash memory 2024, the RAM 2014, or the ROM 2026 and executed by the CPU 2012. The information processing written in these programs is read by the computer 2000, and thereby cooperation between a program and the above-described various types of hardware resources is achieved. An apparatus or method may be constituted by carrying out the operation or processing of information by using the computer 2000.

For example, when communication is carried out between the computer 2000 and an external device, the CPU 2012 may execute a communication program loaded onto the RAM 2014 to instruct communication processing to the communication interface 2022, based on the processing written in the communication program. The communication interface 2022, under control of the CPU 2012, reads transmission data stored on transmission buffering regions provided in recording media such as the RAM 2014 and the flash memory 2024, and transmits the read transmission data to a network and writes reception data received from a network to reception buffering regions or the like provided on the recording media.

In addition, the CPU 2012 may cause all or a necessary portion of a file or a database to be read into the RAM 2014, the file or the database having been stored in a recording medium such as the flash memory 2024, etc., and perform various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may perform various types of processing on the data read from the RAM 2014, which includes various types of operations, information processing, conditional judging, conditional branch, unconditional branch, search/replace of information, etc., as described herein and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The programs or software modules described above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage media. A program stored in the computer-readable storage medium may be provided to the computer 2000 via a network.

A program that is installed in the computer 2000 and causes the computer 2000 to function as the ECU 110 may work on the CPU 2012 and the like to cause the computer 2000 to function as each unit of the ECU 110, respectively. Information processing described in these programs are read into the computer 2000 to cause the computer to function as each unit of the ECU 110, which is a specific means realized by cooperation of software and the various types of hardware resources described above. Then, with these specific means, by realizing computing or processing of information according to an intended use of the computer 2000 in the present embodiment, the specific ECU 110 is constructed according to the intended use.

Various embodiments have been described by referring to the block diagrams and the like. In the block diagram, each block may represent (1) a step of a process in which an operation is executed, or (2) each unit of the apparatus having a role of executing the operation. Certain steps and sections may be implemented by dedicated circuitry, programmable circuitry supplied with computer-readable instructions stored on computer-readable storage media, and/or processors supplied with computer-readable instructions stored on computer-readable storage media. Dedicated circuit may include digital and/or analog hardware circuits and may include integrated circuits (IC) and/or discrete circuits. Programmable circuit may include reconfigurable hardware circuits including logical AND, logical OR, logical XOR, logical NAND, logical NOR, and other logical operations, flip-flops, registers, memory elements, etc., such as field-programmable gate arrays (FPGA), programmable logic arrays (PLA), etc.

Computer-readable storage media may include any tangible device that can store instructions for execution by a suitable device, such that the computer-readable storage medium having instructions stored therein forms at least a portion of an article of manufacture including instructions which can be executed to create means for performing processing operations or operations specified in the block diagrams. Examples of the computer-readable storage medium may include an electronic storage medium, a magnetic storage medium, an optical storage medium, an electromagnetic storage medium, a semiconductor storage medium, and the like. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, special purpose computer, or other programmable data processing apparatus, or to programmable circuit, locally or via a local area network (LAN), wide area network (WAN) such as the Internet, etc., to execute the computer-readable instructions to provide means for performing described processing procedure or operations specified in the block diagrams. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10: vehicle;
20: system;
100: ECU;
110: ECU;
111: ECU;
120: ECU;
121: ECU;
180: CAN communication network;
210: signal detection unit;
220: counting unit;
230: determination unit;
240: cycle measurement unit;
280: storage unit;
2000: computer;
2010: host controller;
2012: CPU;
2014: RAM;
2020: input/output controller;
2022: communication interface;
2024: flash memory;
2026: ROM; and
2040: input/output chip.

What is claimed is:

1. An in-vehicle equipment comprising:
a signal detection unit configured to detect a signal expected to be input to a communication network at a predetermined input cycle;
a counting unit configured to count a number of times a signal is detected by the signal detection unit; and
a determination unit configured to determine whether the number of times counted by the counting unit within a predetermined first period is equal to or less than a threshold value set between a first value calculated by dividing the first period by the input cycle and a second value calculated on a basis of the first period and the input cycle on assumption that an illegal signal is further input to the communication network, wherein
the determination unit is configured to set the threshold value between a maximum value of the first value and a minimum value of the second value calculated on assumption that an error is included in the first period and the input cycle.

2. The in-vehicle equipment according to claim 1, further comprising
a cycle measurement unit configured to measure an actual measurement value of the input cycle on a basis of the number of times counted by the counting unit, wherein the determination unit is configured to
determine whether the number of times counted by the counting unit within a predetermined second period is equal to or less than a predetermined third value until the actual measurement value of the input cycle is measured by the cycle measurement unit, and
calculate the first value by dividing the first period by the actual measurement value of the input cycle when the actual measurement value of the input cycle is measured by the cycle measurement unit,
calculate the second value calculated on a basis of the first period and the actual measurement value of the input cycle on assumption that an illegal signal is further input to the communication network, and
start determination as to whether the number of times counted by the counting unit within the first period is equal to or less than the first value.

3. The in-vehicle equipment according to claim 2, wherein
when the actual measurement value of the input cycle is measured by the cycle measurement unit, the determination unit is configured to set the first period shorter than the second period on a basis of the actual measurement value of the input cycle.

4. A vehicle comprising the in-vehicle equipment according to claim 1.

5. An in-vehicle equipment comprising:
a signal detection unit configured to detect a signal expected to be input to a communication network at a predetermined input cycle;
a counting unit configured to count a number of times a signal is detected by the signal detection unit; and
a determination unit configured to determine whether the number of times counted by the counting unit within a predetermined first period is equal to or less than a first value calculated by dividing the first period by a past actual measurement value of the input cycle, wherein
the determination unit is configured to determine whether the number of times counted by the counting unit within the first period is equal to or less than a maximum value of the first value calculated on assumption that an error is included in the first period.

6. The in-vehicle equipment according to claim 5, wherein
the determination unit is configured to determine whether the number of times counted by the counting unit within the first period is equal to or less than a threshold value set between the first value and a second value calculated on a basis of the first period and the actual measurement value of the input cycle on assumption that an illegal signal is further input to the communication network.

7. The in-vehicle equipment according to claim 6, wherein
the determination unit is configured to set the threshold value between a maximum value of the first value and a minimum value of the second value calculated on assumption that an error is included in the first period.

8. The in-vehicle equipment according to claim 5, further comprising
a cycle measurement unit configured to measure the actual measurement value of the input cycle on a basis of the number of times counted by the counting unit, wherein
the determination unit is configured to
determine whether the number of times counted by the counting unit within a predetermined second period is equal to or less than a predetermined third value until the actual measurement value of the input cycle is measured by the cycle measurement unit, and when the actual measurement value of the input cycle is measured by the cycle measurement unit, calculate the first value by using the actual measurement value of the input cycle, and start determination as to whether the number of times counted by the counting unit within the first period is equal to or less than the first value.

9. The in-vehicle equipment according to claim 8, wherein when the actual measurement value of the input cycle is measured by the cycle measurement unit, the determination unit is configured to set the first period shorter than the second period on a basis of the actual measurement value of the input cycle.

10. The in-vehicle equipment according to claim 6, further comprising a cycle measurement unit configured to measure the actual measurement value of the input cycle on a basis of the number of times counted by the counting unit, wherein the determination unit is configured to determine whether the number of times counted by the counting unit within a predetermined second period is equal to or less than a predetermined third value until the actual measurement value of the input cycle is measured by the cycle measurement unit, and when the actual measurement value of the input cycle is measured by the cycle measurement unit, calculate the first value by using the actual measurement value of the input cycle, and start determination as to whether the number of times counted by the counting unit within the first period is equal to or less than the first value.

11. The in-vehicle equipment according to claim 7, further comprising a cycle measurement unit configured to measure the actual measurement value of the input cycle on a basis of the number of times counted by the counting unit, wherein the determination unit is configured to determine whether the number of times counted by the counting unit within a predetermined second period is equal to or less than a predetermined third value until the actual measurement value of the input cycle is measured by the cycle measurement unit, and when the actual measurement value of the input cycle is measured by the cycle measurement unit, calculate the first value by using the actual measurement value of the input cycle, and start determination as to whether the number of times counted by the counting unit within the first period is equal to or less than the first value.

12. The in-vehicle equipment according to claim 10, wherein when the actual measurement value of the input cycle is measured by the cycle measurement unit, the determination unit is configured to set the first period shorter than the second period on a basis of the actual measurement value of the input cycle.

13. The in-vehicle equipment according to claim 11, wherein when the actual measurement value of the input cycle is measured by the cycle measurement unit, the determination unit is configured to set the first period shorter than the second period on a basis of the actual measurement value of the input cycle.

14. A vehicle comprising the in-vehicle equipment according to claim 5.

15. A method comprising:

detecting a signal expected to be input to a communication network at a predetermined input cycle;

counting a number of times the signal is detected;

determining whether the number of times counted within a predetermined first period is equal to or less than a threshold value set between a first value calculated by dividing the first period by the input cycle and a second value calculated on a basis of the first period and the input cycle on assumption that an illegal signal is further input to the communication network; and setting the threshold value between a maximum value of the first value and a minimum value of the second value calculated on assumption that an error is included in the first period and the input cycle.

* * * * *